United States Patent [19]

Deffeyes

[11] Patent Number: 5,001,754
[45] Date of Patent: Mar. 19, 1991

[54] ENCRYPTION SYSTEM AND METHOD

[75] Inventor: Kenneth S. Deffeyes, Princeton, N.J.

[73] Assignee: The Trustees of Princeton University, Princeton, N.J.

[21] Appl. No.: 473,319

[22] Filed: Feb. 1, 1990

[51] Int. Cl.[5] .............................................. H04L 9/00
[52] U.S. Cl. .................................. 380/46; 364/224.21
[58] Field of Search ...................... 380/46; 364/224.21

[56] References Cited

U.S. PATENT DOCUMENTS 4,755,969 7/1988 Pappas ............................ 364/221.24
4,817,148 3/1989 Lafferty et al. ....................... 380/46

Primary Examiner—Thomas H. Tarcza
Assistant Examiner—David Cain
Attorney, Agent, or Firm—Perman & Green

[57] ABSTRACT

A method for encrypting data is described which employs a key that includes a plurality of alphanumeric characters and a memory array adapted to operate on NxM pixel display. The method includes the steps of:

a. inserting data in the memory array which, if written to the display would substantially fill it with a diffuse pattern of on and off pixels;
b. selecting a first subarray of data from the memory array, the selection being controlled by a predetermined function;
c. logically combining the selected first subarray of data with a second, equal size, subarray of data, using an exclusive-OR function, the second subarray determinable from the predetermined function.
d. writing the results of the logical combination into a corresponding second subarray area in the memory array;
e. repeating, in accordance with a predetermined function, steps b, c, and d until the memory array contains a pseudorandom distribution of bits; and
f. logically combining data (or encrypted data) with the pseudorandom distribution of bits, by using an exclusive-OR function to encrypt (or to decrypt) the data.

9 Claims, 3 Drawing Sheets $\oplus$ = XOR

ENCRYPTION SYSTEM AND METHOD

FIELD OF THE INVENTION

This invention relates to a method for data encryption, and more particularly, to an encryption method which is particularly adapted to implementation on personal computer size, data processing systems.

BACKGROUND OF THE INVENTION

It is generally accepted that the one-time pad is the only completely secure cryptographic system. Its generation depends on the use of a truly random key which is at least as long as the plain text to be encrypted. The security comes from the fact that an encrypted text could have come from any equally lengthy plain text, encrypted with some unknown key. There is no way that redundancy within the plain text can be used to determine which possible decipherment of the text is correct, because all plain texts are equally possible.

The one-time pad requires a long sequence of random numbers and that sequence must be duplicated and distributed to each user. Random number functions in data processing systems have been used to generate pseudorandom sequences of numbers from an initial seed. While the sequences appear random, they are generated in a deterministic manner that repeats with a definite cycle length. It has been shown that ciphers constructed from these sequences are vulnerable to attack using a probable word method, i.e. see "Problems with Chaotic Cryptosystems", Wheeler, Cryptologia, Vol. XII, No. 3, (1989) pp. 243–250.

The test of a crytographically strong pseudorandom encryption system is to supply the full details of the encryption algorithm and a large sample of the pseudorandom output to an analyst. Without being told the secret key which controls the starting condition and the mixing, the analyst is asked to predict the next bits in the pseudorandom output beyond the end of the furnished sample. While it is impossible to prove that a pseudorandom generator is crytographically strong, the strength of the system can be rated by the number of analyst-years expended in unsuccessful attempts to find a de-encryption method more efficient than brute force substitution of probable keys.

The prior art has employed various shift register schemes in combination with key controlled variables, to produce pseudorandom encrypted outputs. Such ciphers are subject to attack through mathematical matrix inversion techniques. For instance, "Cryptanalysis of the Ciarcia Circuit Cellar Data Encryptor", Pearson, Cryptologia, Vol. 12, No. 1, pp. 1–10 (1988), describes an attack of the above-noted type. It describes a system which employs a 54 bit shift register that acts to combine a plain text bit stream with a stream of "key" bits using an exclusive-OR function. The key stream generator, described by Pearson, combines two linear feedback shift registers which provide a total of $2^{54}$ possible internal states for the generator. While this generator has excellent pseudorandom properties, Pearson shows it to be readily amenable to a matrix inversion attack, using a $54 \times 54$ matrix. Such a matrix can be solved on a personal computer.

As matrices increase in size, the computation power required for solution increases as the cube of the matrix size. Thus, in order to defeat matrix-inversion techniques, it is desirable to make the potential matrix as large as possible. This is impractical with shift register chains such as are described by Pearson.

Many current personal computers are particularly adapted to manipulating large quantities of image data. Such computers include circuits which copy data in large blocks from one memory location to another and, in addition, perform logical operations on the data as it is being transferred. Certain of these circuits are referred to as "blitters" (for block image transferer). In systems which use blitters, images in memory are often stored in a linear fashion, with each word of data being located at an address that is one greater than the word on its left. A blitter can efficiently copy blocks of such data, combine it with data from a separate image source during a data move, and place the data in another memory. Considering that a display may contain a large number of pixels (e.g. a $512 \times 640$ display with a depth of 5 bits per pixel contains 1,683,400 bits), a PC having a graphics circuit such as a blitter is able to handle and process large numbers of graphics bits in an efficient and low cost basis. Such circuits are amenable to use with encryption systems.

Accordingly, it is an object of this invention to provide an improved pseudorandom encryption method and system.

It is another object of this invention to provide an improved pseudorandom encryption method which makes use of the capabilities of graphics data circuits in personal computer size data processing systems.

SUMMARY OF THE INVENTION

A method for encrypting data is described which employs a key that includes a plurality of alphanumeric characters and a memory array adapted to operate an NxM pixel display The method includes the steps of:
a. inserting data in the memory array which, if written to the display would substantially fill it with a diffuse pattern of on and off pixels;
b. selecting a first subarray of data from the memory array, the selection being controlled by a predetermined function;
c. logically combining the selected first subarray of data with a second, equal size, subarray of data, using an exclusive-OR function, the second subarray determinable from the predetermined function.
d. writing the results of the logical combination into a corresponding second subarray area in the memory array;
e. repeating, in accordance with a predetermined function, steps b, c, and d until the memory array
f. contains a pseudorandom distribution of bits; and logically combining data (or encrypted data) with the pseudorandom distribution of bits, by using an exclusive-OR function to encrypt (or to decrypt) the data.

DETAILED DESCRIPTION OF THE INVENTION

Figure 1:
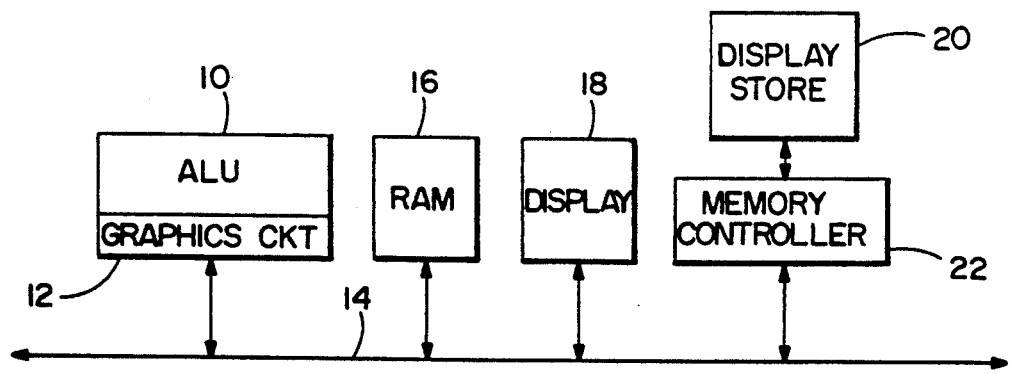
FIG. 1 is a high level block diagram of a personal computer structure adapted to perform the method of the invention.

Referring to FIG. 1, a high level block diagram of a data processing system adapted to implement the method of the invention is illustrated. Arithmetic logic unit (ALU) 10 is provided with a graphics "circuit" 12 adapted to handle the movement of substantial chunks of graphical data from position to position within the system. Communications within the data processing system occur over bus 14. Random access memory 16, display 18, display store 20 and memory controller 22 are all connected to bus 14 and interact therethrough.

Figure 2:
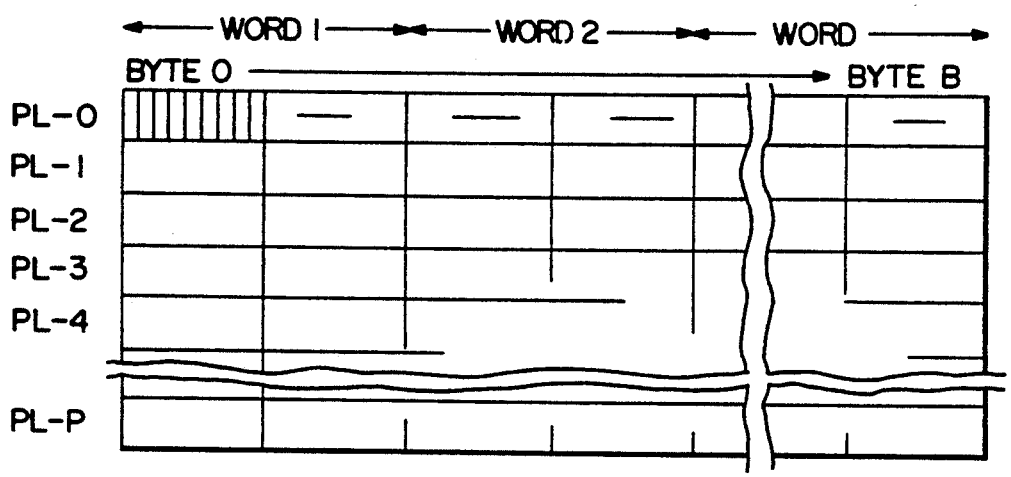
FIG. 2 is a schematic diagram showing a display memory usable with the invention.

In FIG. 2, an exemplary layout of display memory 20 is illustrated. Along one dimension, it is comprised of a plurality of planes, PL-0 through PL-P, and along the other dimension, it contains a plurality of bytes from Byte 0 to Byte B. Each word is shown as comprising two bytes, with each byte being eight bits in length. The structure of display store 20 is conventional and is illustrated merely to show one possible arrangement of data. The data from each plane is serially read out; converted to pixel data and written onto display 18 for viewing. Assuming that display 18 is of the raster-scan variety, pixels are written in a raster-scan manner in accordance with the particular bytes of data found in each plane of display store 20. As will become hereinafter apparent, it is preferred, during the operation of this invention, to be able to divide the memory structure of display store 20 at other than a word boundary so as to assure complete "mixing" of the data.

This encryption system, as with most others, is dependent on the use of a secret key. To defeat "brute force" attempts to crack a cryptogram by trying all possible keys, it is preferred that the key should contain at least 64 bits; the equivalent of about 20 random digits. Because of the difficulty of remembering a string of 20 random digits, and because security is best if the secret key is never written down or preserved on a computer disk, it is preferable to have a key composed of easily remembered words that can be entered from the keyboard without error.

It is characteristic of one-time pad encryption that the key can be used only once. (Two messages encrypted with the same pad can be deciphered.) The present invention can make use of a method of combining (by concatenation or by exclusive-OR) the time and date of encoding with the secret portion of the key to insure automatically that the same key is never used twice. However, the time and date have to be transmitted "in the clear" along with the encoded message. One normally would absolutely avoid letting a potential cryptanalyst know a portion of the key. However, one of the strengths of the present invention is that an exact knowledge of a portion of the key gives the cryptanalyst no useful advantage, as long as a sufficiently long remainder of the key is still unknown.

The method of the present invention is to load copies of the key into a sizeable block of memory and repeatedly to combine, using the exclusive-OR operator, shifted portions of that block with itself until a pseudorandom result is obtained. The number of cycle of exclusive-OR combination required for encipherment is the base-two logarithm of the number of bits in the memory block. In contrast, a cryptanalyst using matrix inversion (the method of choice in defeating many encryption techniques) finds that the computational effort in matrix inversion depends on the cube of the matrix size. This dependence of effort on the size of the memory block (i.e., at least 100,000 bits) is a primary source of strength of the present invention. Doubling the size of the memory array adds one additional cycle to the encipherment but makes matrix inversion a factor of eight more costly. Because methods of attack other than matrix inversion exist, the aim of this invention is to prevent the cryptanalyst from separating out a subset of the problem and using a "divide-and conquer" approach.

It is desirable, when implementing this invention on a personal computer, to utilize as much memory as is available. Since a portion of the memory is almost always reserved for the screen display, more memory is available if the display store serves as the primary "memory block" described above. The exclusive-OR combination of portions of the display store with rearranged portions of itself can be accomplished by copying the contents of all or a part of the display store, as observed on the screen, to another block of memory and forming the exclusive-OR combination of transforms of the copy with the original contents of the display store. (For clarity, hereafter screen will refer to the display storage area and memory will refer to a place for storing temporary copies. However, the process can be implemented equally well with two or more storage areas anywhere in the computer.)

The secret key, with or without the time and date, can be used: (1) to initialize the screen, (2) to control the size of blocks to be exclusive-OR'd with the screen, or (3) both for initialization and control. In the preferred example discussed below, the secret key is exclusive-OR'd with the time and date and the result is used to initialize the screen. Then, as explained below, the evolving pseudorandom numbers are used to control memory blocks that are exclusive-OR'd with the screen.

Obviously, the amount of information in the key (the order of 100 bits) is small compared to the size of the screen (hundreds of thousands to millions of bits). The screen is going to start with a low apparent entropy, in the information theory sense, and the exclusive-OR recombinations are going to increase the apparent entropy to essentially an equilibrium value that resembles random noise. The most desirable starting condition is one that most quickly advances to a near-equilibrium distribution. At equilibrium, very close to half of the bits will be ones and the other half zeros. Therefore, one criterion for a starting condition sets roughly half of the bits to one. Higher-order criteria are more difficult to quantify. However, since the human eye is very good at seeing patterns, one rough criterion for a good starting condition is that the eye cannot discern structure in the screen display.

Figure 3:
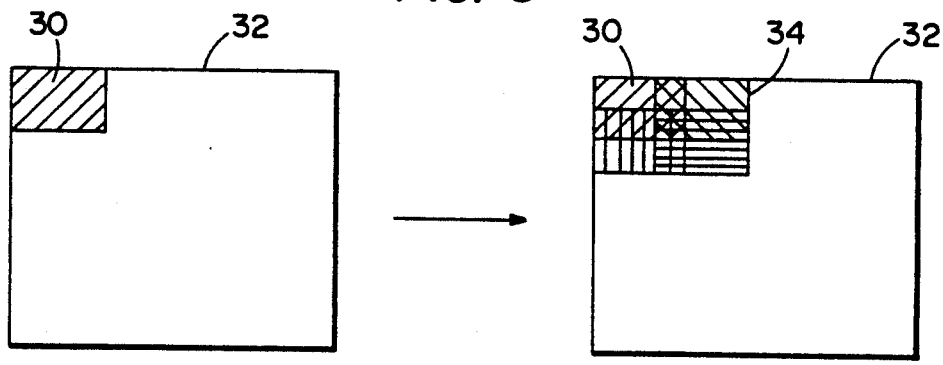
FIG. 3 indicates starting conditions for filling a screen with key-related data.

A method for creating a visually structureless starting condition is shown in FIG. 3. Initially, the alphabetic information in the key is converted to binary values and written into a small rectangle 30 in the corner of an otherwise empty screen 32. Subsequently three additional copies of the same rectangle of data are partially overlapped with the first rectangle to produce a larger rectangle 34. The overlapping area pixel values are exclusive-OR'd before being rewritten to the screen. Now a copy (or copies) of the resulting larger rectangle is (are) partially overlapped to produce an even larger rectangle. The size of the rectangle grows exponentially and about ten cycles suffice to fill the screen with a visually patternless display.

Although the starting display may not show visible structure to the eye, it is far from being a crytographically secure pseudorandom set of bits. The disorder is increased to approach the entropy of a truly random set of bits by repeatedly combining, using exclusive-OR, the display with geometrically transformed copies of the display.

Efficient geometrical transformations of copies of the display for recombination should have several characteristics. All of the display should be involved in each cycle, so that there are no "dead spots" that get mixed more slowly than the rest of the screen. In addition, the geometrical transformation should cause mixing within words, mixing between the depth layers that control the screen display, as well as mixing along the vertical and horizontal directions of the screen.

Figure 4:
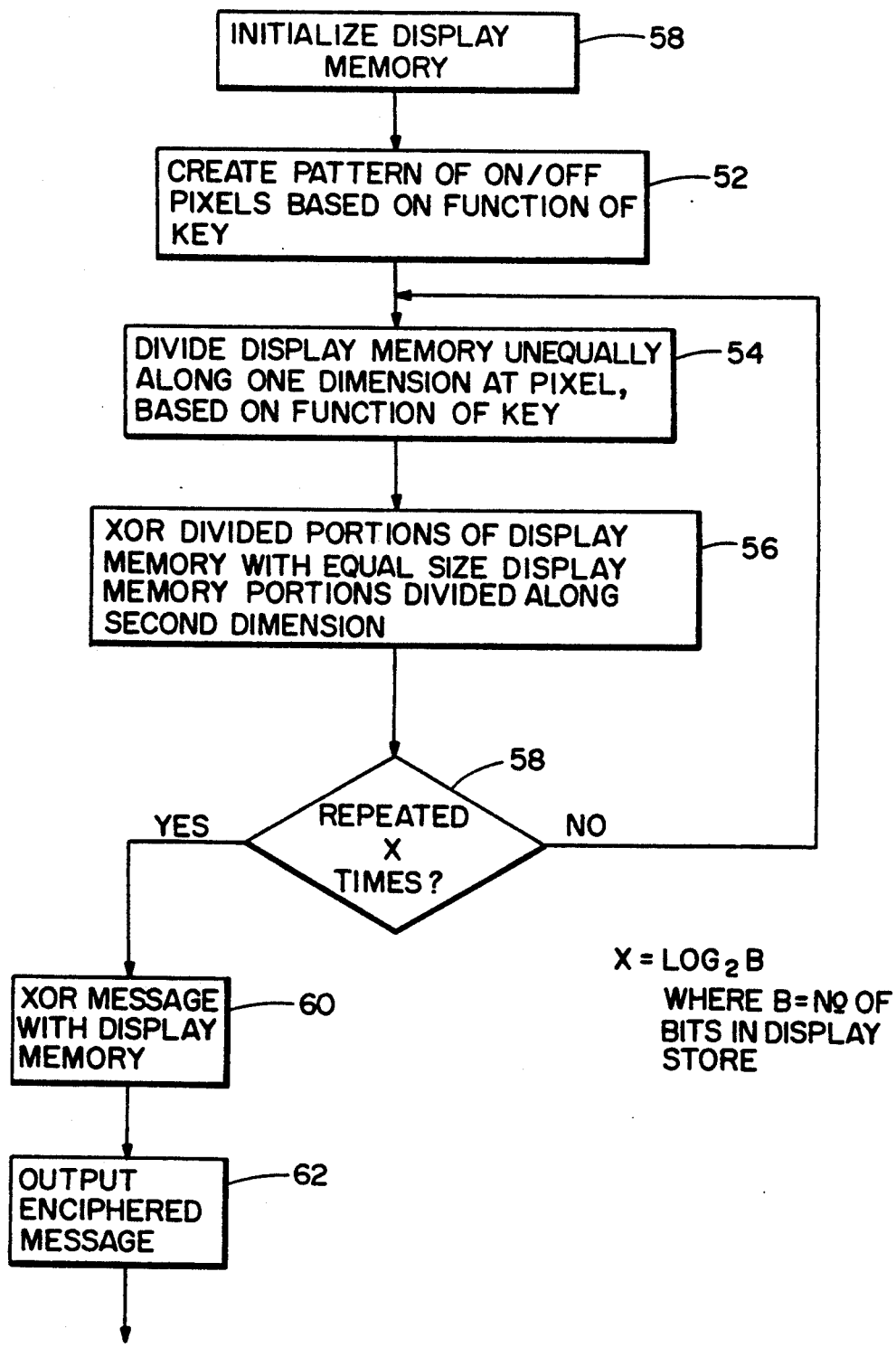
FIG. 4 is a high level flow diagram illustrating the method of the invention.
Figure 5:
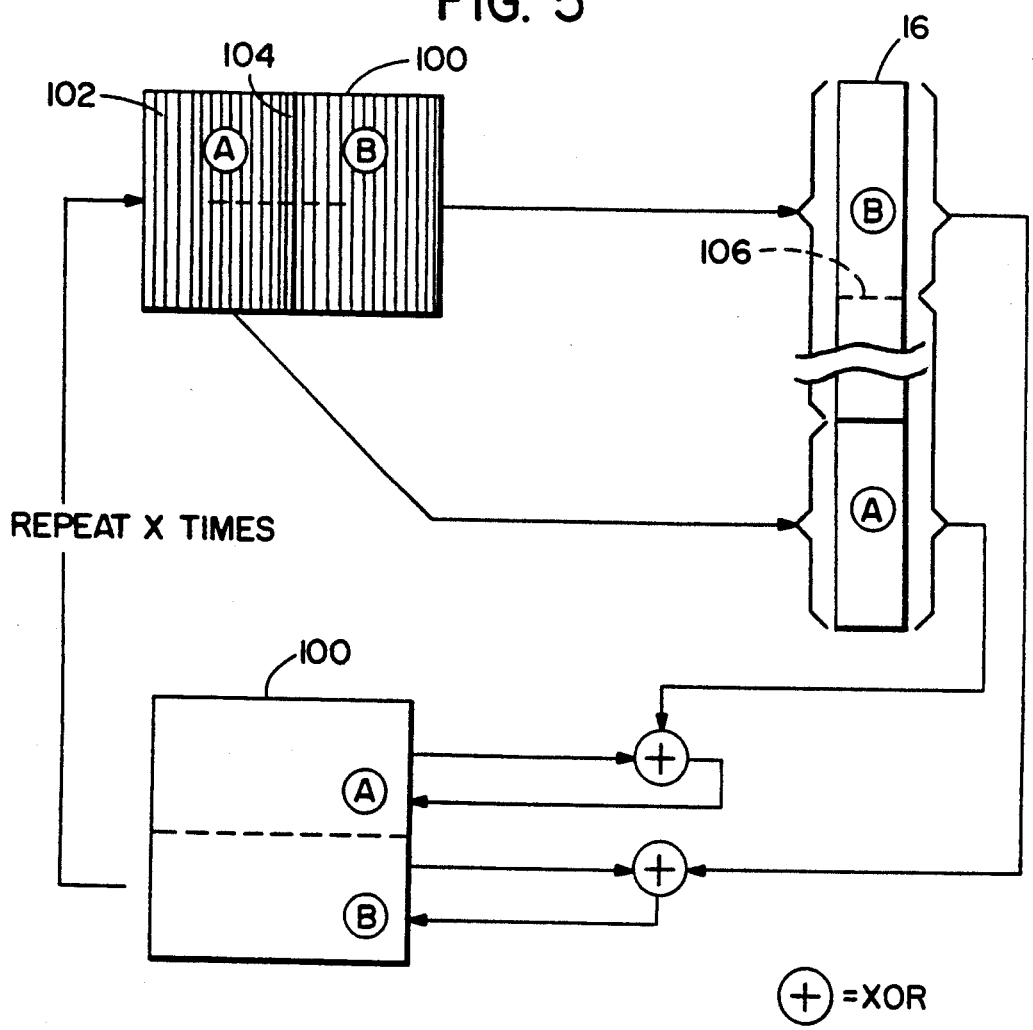
FIG. 5 is a logical block diagram useful in understanding the flow diagram of FIG. 3.

One transformation which satisfies these several criteria is shown in FIGS. 4 and 5. During each cycle, a number chosen from the current copy of the display (or the key) is used to divide the screen vertically into two unequal portions and copies of the left and right portions of the screen are transferred into consecutive storage locations in a memory array separate from the memory that controls the screen. In turn, yet another number chosen from the evolving copy of the display (or the key) is used to divide that memory array into two different unequal portions. The top portion of the array is combined, using exclusive-OR, with the bottom of the screen and the bottom portion of the array is exclusive-OR'd with the top of the screen.

Such a transformation is noncommutative and has the advantage that any bit on the screen can potentially advance to the origin in the upper left hand corner of the screen in each cycle. This diffusion of information from anywhere to anywhere in each cycle makes it difficult for the cryptanalyst to work on a subset of the system. The noncommutative property requires the cryptanalyst not only to specify the two locations of the cuts in each step but also to specify the order in which the steps were taken. The exclusive-OR operator itself is irreversible: either combining two ones or combining two zeros leads to the same result and the cryptanalyst has no way of deciding on one or the other possibility.

The number of cycles required to maximize the apparent entropy of the starting condition is the base-two logarithm of the number of bits in the screen memory. One can see this result intuitively by imagining a blank screen filled with zeros except for a single "one". With each cycle of exclusive-OR, the number of ones doubles. The number of doublings required for that single "one" to potentially fill the screen is the base-two logarithm of the number of screen bits.

Once the pseudorandom numbers are in place, data can be encrypted by forming the exclusive-OR combination of the data with the pseudorandom numbers. Decrypting uses exactly the same procedure: the pseudorandom numbers are formed (with time and date, if used, from the heading of the cryptogram) and the exclusive-OR combination of the cryptogram with the pseudorandom numbers gives the original data. The data can equally well be text, numbers, or graphics: anything that can exist in digital form. The cryptogram gives no hint even as to the type of material that is encoded.

Referring now to FIG. 4, display memory 20 is initialized (e.g. its contents "dumped") in preparation for the commencement of the routine (Box 50). Subsequently, a pattern of pixels is created on display 18 in accordance with the method described for FIG. 3 (with approximately 50% of the pixels being on and 50% being off).

Once a pattern is present on display 18, the display is unequally divided along one dimension at a known pixel location, (based upon a function of the key). The two portions of the divided display are then stored in RAM 16 (Box 54).

As will be understood by those skilled in the art, each of the aforesaid steps, as well as those steps to be described below must be deterministic, i.e. each must be determinable by a known function of the key or some other function which is known to both the receiver and the transmitter of the message. For instance, the division of the pattern on the screen of display 18 may take place at a given pixel whose position is determined by a given letter (or space) of the key, or the division could be controlled by some more complicated function of the key. The evolving pseudorandom display itself is a complicated function of the key that can serve to control the division.

Referring to FIG. 4, screen 100 is divided into two portions by divider 104. Portion A and Portion B are stored as a serial list in RAM 16. Subsequently, the lists stored in RAM 16 are divided at a new dividing line 106 (whose position along the list is again determinable by a function of the key). The two new portions of the list are then exclusive-OR'd with equal size portions of the display store (as represented on screen 100). The results are returned to the display store and indicated on screen 100. The number of times the process is repeated is at least:

$$\text{Log}_2 (N \times M \text{ pixels})(\text{bits/pixel})$$

It is to be understood that divider 106 may be caused to change after each iteration by the addition or subtraction of a number, determinable from the key, to obtain a new divider position.

From the above, it can be seen that the generation of the pseudorandom pixel array utilizes a very large size memory array (on the order of 250,000 bits or higher), and that any one pixel can affect any other pixel during the process of the mixing. The process is noncommutative, in that, it is dependant upon the order in which the process is accomplished. Finally, by utilizing substantial portions of the display store; exclusive-OR'ing those portions with different portions of the display memory; and rewriting the exclusive-OR'd results back into the display memory, the entire screen (and associated memory) is operated upon, thereby resulting in excellent diffusion of the original information throughout the screen.

Figure 6:
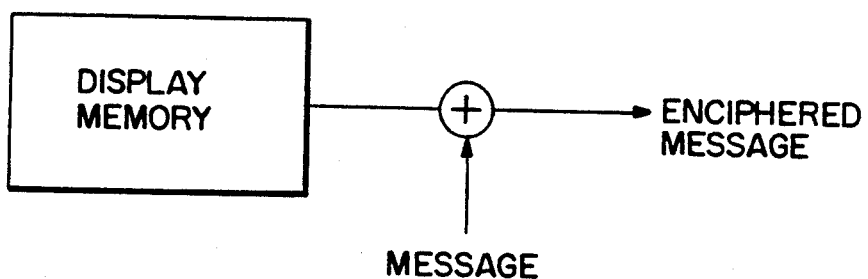
FIG. 6 is a logical block diagram showing how a message is encrypted after the display has been pseudo-randomly created.

To encode a message, the plain text of the message is loaded into a register (see FIG. 4, box 60) and exclusive-OR'd, on a bit by bit basis with the one or 0 state of each succeeding bit along a scan line of display screen 100. The system then outputs the enciphered message (box 62) and transmits it to the user. (This function is also illustrated in FIG. 6). At the receiving end, the message can be readily deciphered, assuming the receiver is aware of the key, by performing the identical routine shown in FIG. 4 to create an identical pseudorandom pixel image and then, by exclusive-OR'ing the received message bits with the pseudorandom pixel representations, the original clear text can be derived.

This invention has been configured on an Amiga 1000 which has a blitter circuit as aforedescribed. The subroutine employed, in the main, "GET" and "PUT" commands, the combination of which enabled the system to generate quickly and efficiently the pseudorandom pixel array.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for encrypting data which employs a secret key and a memory array of a size capable of operating a display where the size of said memory array is at least 100,000 bits, the method comprising:
   a. inserting data in said memory array, which if written to said display, would substantially fill said display with a pattern of on and off pixels;
   b. selecting a first subarray of data from said memory array, said subarray of data comprising a substantial portion of data in said memory array, said selection controlled by a predetermined function;
   c. Logically combining said first selected subarray of data with a second, equal size, subarray of data from said memory array, using an exclusive-OR function, said second subarray determinable from said predetermined function;
   d. storing the results of said logical combination;
   e. repeating, in accordance with said predetermined functions, steps b, c, and d until said stored results constitute a pseudorandom distribution of bits; and
   f. logically combining a message with said pseudorandom distribution of pixel data, by using an exclusive-OR function to encipher said data.

2. The method of claim 1 wherein said data inserted in said memory array in step (a) is a function of said key.

3. The method of claim 2 wherein said inserting step (a) further comprises the substeps of:
   a1. writing into a first section of said memory array a first pixel pattern of said alphanumeric key;
   a2. producing a plurality of additional pixel representation patterns of said alphanumeric key;
   a3. choosing additional sections of said memory array, said additional sections partially overlapping said first section;
   a4. creating a new pixel pattern by writing said additional pixel representation patterns into said additional sections, but where said sections overlap, writing the exclusive-OR of overlapping pixel representations; and
   a5. employing said new pixel pattern in place of said first pixel pattern and repeating steps a2–a4.

4. The method of claim 1 wherein said predetermined function which controls steps b and c is determinable from said key.

5. The method of claim 1 wherein said steps b, c, and d are repeated $Log_2 X$ times where:

$$x = (N \times M \text{ pixels})(\text{bits/pixel}).$$

6. A method for encrypting data which employs an alphanumeric key and a display store adapted to operate a horizontal raster scan display screen comprising the steps of:
   a. writing in said display store, data based upon said alphanumeric key, said data filling said display store and said screen;
   b. dividing said screen vertically into unequal portions, said portions dependent in size upon a function of said key;
   c. sequentially listing pixel data in one portion and then pixel data in an adjacent portion;
   d. dividing said listing into at least two segments, at a location determinable as a function of said key;
   e. Exclusive-OR'ing one said segment of said listing with a first horizontal portion of data in said display store, and Exclusive-OR'ing another said segment of said listing with the remaining horizontal portion of data in said display store;
   f. rewriting said exclusive-OR results from step e into said display store;
   g. repeating steps b–f until a pseudorandom distribution occurs of data in said display store.

7. The method of claim 6 wherein said alphanumeric key comprises both an invariable portion and a variable portion which changes on a predetermined basis.

8. The method of claim 6 wherein said repeating step (g) occurs:

$$log_2 x \text{ times, where } x = (N \times M \text{ pixels})(\text{bits/pixel})$$

9. The method of claim 6 further comprising the step of:
   h. logically combining a message with said pseudorandom distribution of pixel data, by using an exclusive-OR function to encipher said data.

* * * * *